United States Patent
Ishii (10) Patent No.: US 10,397,487 B2
(45) Date of Patent: Aug. 27, 2019

(54) SIGNAL PROCESSING APPARATUS, SIGNAL PROCESSING METHOD, AND IMAGE CAPTURING APPARATUS

(71) Applicant: CANON KABUSHIKI KAISHA, Tokyo (JP)

(72) Inventor: Yoshiki Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 15/558,510

(22) PCT Filed: Mar. 10, 2016

(86) PCT No.: PCT/JP2016/001343
§ 371 (c)(1),
(2) Date: Sep. 14, 2017

(87) PCT Pub. No.: WO2016/147625
PCT Pub. Date: Sep. 22, 2016

(65) Prior Publication Data
US 2018/0084174 A1 Mar. 22, 2018

(30) Foreign Application Priority Data
Mar. 17, 2015 (JP) .................................. 2015-054063

(51) Int. Cl.
*H04N 5/20* (2006.01)
*H04N 5/232* (2006.01)
*H04N 5/235* (2006.01)

(52) U.S. Cl.
CPC ............. *H04N 5/2352* (2013.01); *H04N 5/20* (2013.01); *H04N 5/23293* (2013.01)

(58) Field of Classification Search
CPC .... H04N 5/2352; H04N 5/23293; H04N 5/20; H04N 7/00; H04N 9/68; H04N 9/64;
(Continued)

(56) References Cited

U.S. PATENT DOCUMENTS

| 8,184,112 B2 * | 5/2012 | Miller .................. G09G 3/3233 |
| | | 345/205 |
| 9,077,994 B2 * | 7/2015 | Miller ...................... G06F 3/14 |

(Continued)

FOREIGN PATENT DOCUMENTS

| CN | 102354489 A | 2/2012 |
| CN | 103067671 A | 4/2013 |

(Continued)

OTHER PUBLICATIONS

Mantiuk, et al., "Lossy Compression of High Dynamic Range Images and Video", Proc. of SPIE—IS & T Electronic Imaging, vol. 6057, pp. 60570V-1-60570V-10, Feb. 9, 2006.

*Primary Examiner* — Pritham D Prabhakher
(74) *Attorney, Agent, or Firm* — Canon U.S.A., Inc. I.P. Division (57) ABSTRACT

A signal processing apparatus that processes a video signal includes a signal conversion unit configured to convert a first video signal quantized according to a first characteristic to represent a video image with a relative luminance, into a second video signal quantized according to a second characteristic to represent the video image with an absolute luminance in an output of a display device based on a predetermined conversion correspondence relationship, and a signal output unit configured to output information representing the conversion correspondence relationship in association with at least one of the first video signal and the second video signal.

14 Claims, 10 Drawing Sheets (58) Field of Classification Search
CPC . H04N 19/00981; G06T 11/001; G06T 5/009;
G06T 5/50; G09G 5/006; G09G 5/02;
G09G 2320/0606; G09G 2320/0613;
G09G 2320/066; G09G 2320/0271; G09G
2340/06; G09G 2370/04; G09G 2370/12;
G11B 27/329; G11B 20/10
USPC ...................................................... 348/222.1
See application file for complete search history.

(56) References Cited

U.S. PATENT DOCUMENTS

| | | | |
|---|---|---|---|
| 9,451,274 B2* | 9/2016 | Mertens | H04N 19/46 |
| 10,097,822 B2* | 10/2018 | Newton | G09G 5/006 |
| 2007/0055143 A1* | 3/2007 | Deroo | G09G 3/006 |
| | | | 600/425 |
| 2010/0073338 A1* | 3/2010 | Miller | G09G 3/3233 |
| | | | 345/205 |
| 2013/0315505 A1* | 11/2013 | Atkins | G06T 3/4007 |
| | | | 382/300 |
| 2014/0029665 A1* | 1/2014 | Damkat | H04N 19/172 |
| | | | 375/240.03 |
| 2014/0079113 A1 | 3/2014 | Newton et al. | |
| 2014/0210847 A1 | 7/2014 | Knibbeler | |
| 2014/0247870 A1* | 9/2014 | Mertens | H04N 19/46 |
| | | | 375/240.08 |
| 2014/0363093 A1* | 12/2014 | Miller | G06F 3/14 |
| | | | 382/235 |
| 2015/0201222 A1* | 7/2015 | Mertens | H04N 19/46 |
| | | | 382/233 |
| 2015/0221280 A1* | 8/2015 | Van Der Vleuten | |
| | | | H04N 1/6027 |
| | | | 382/167 |

FOREIGN PATENT DOCUMENTS

| | | |
|---|---|---|
| CN | 103827956 A | 5/2014 |
| KR | 10-2014-0066771 A | 6/2014 |
| KR | 10-2015-0023947 A | 3/2015 |
| WO | 2013/046096 A1 | 4/2013 |
| WO | 2014/178286 A1 | 11/2014 |

* cited by examiner

SIGNAL PROCESSING APPARATUS, SIGNAL PROCESSING METHOD, AND IMAGE CAPTURING APPARATUS

TECHNICAL FIELD

The present invention relates to signal processing for a video signal, and more particularly, to signal processing for processing a high dynamic range video signal.

BACKGROUND ART

In recent years, technological innovation of a display device such as a video display or a projector has enabled higher luminance and higher dynamic range video display than those in a conventional cathode ray tube (CRT) display. While a master monitor (CRT master monitor) in the conventional CRT display has performed display with a luminance of 100 nit ($cd/m^2$) for 100% white of a video signal, for example, the current display device can generally perform display with a luminance of 100 nit or more.

A display device referred to as a High Dynamic Range (HDR) display has also appeared, which can perform display with a luminance of 1000 to 4000 nit.

To perform higher dynamic range video display using the display device such as the HDR display, an HDR EOTF capable of representing an HDR signal range by expanding an Electro-Optical Transfer Function (EOTF) corresponding to a display gamma defined for a conventional Standard Dynamic Range (SDR) display has been required.

As an example of the HDR EOTF, an HDR EOTF to which a Perceptual Quantizer (PQ) having a visually optimum quantization accuracy is applied has been standardized for a display luminance range up to 10000 nit which is wider than a conventional range. The EOTF represented by the PQ is an absolute luminance EOTF because it is defined as a quantization value for an absolute luminance at a video output of the display device.

On the other hand, a characteristic of an image capturing apparatus corresponding to a camera gamma of a video camera generally shows a property, which approximates a reverse characteristic of a display EOTF or to which a total gamma of a system is added, and which is referred to as an Optical-Electro Transfer Function (OETF). The OETF standardized in BT.709 is an SDR OETF optimized for the above described CRT master monitor having a luminance of 100 nit. In recent years, it has been known that a system gamma becomes 1.2 when combined with BT.1886 standardized as an EOTF for a flat panel display.

While the EOTF represented by the PQ is an absolute luminance EOTF, a conventional camera-type OETF is a relative luminance OETF allocated to a sensor output value, which varies depending on dimming using a diaphragm or a filter in a lens optical system, a shutter speed, and a gain setting of a sensor circuit with a sensor output for an object having a standard reflectance as a predetermined reference value. Correct exposure is generally determined with an output value of a standard white object or a 18% gray object as a reference in BT.709, for example.

CITATION LIST

Non Patent Literature

[NPL 1] Rec. ITU-R Bt.709
[NPL 2] SMPTE ST 2084:2014

The above described SDR OETF has been problem-free in a situation where the dynamic range of the display device is narrow. However, to combine the SDR OETF with the HDR EOTF in the HDR display, such as the PQ, the SDR OETF needs to be output as an HDR OETF by predetermined conversion.

In recent years, professional-use camera systems which can capture an image using an OETF having a wider dynamic range called a Log gamma instead of a conventional camera gamma have been increasing in number. If such a camera system is used, conversion into an OETF having a wider dynamic range can be carried out.

However, an OETF of an image capturing apparatus including a Log gamma is a relative luminance OETF, as described above. To convert the relative luminance OETF into an absolute luminance OETF corresponding to the absolute luminance EOTF in the display device, therefore, a criterion for converting a relative luminance into an absolute luminance is required.

In normal image capturing with a camera, a method for image capturing purposely under exposure amount control has been generally used to place a high luminance object within a signal range and maintain a desired optical diaphragm value and shutter speed.

To monitor a video image captured under such exposure control with a brightness desired by a user, a conversion criterion from a relative luminance OETF to an absolute luminance OETF needs to be changed depending on an image capturing situation. If video data to be recorded or transmitted has an original relative luminance OETF, therefore, in order to reproduce the brightness obtained at the time of the monitoring and replay the video image, the brightness during the reproduction needs to match a brightness in the absolute luminance EOTF at which the video signal has been monitored.

SUMMARY OF INVENTION

According to an aspect of the present invention, a signal processing apparatus that processes a video signal includes a signal conversion unit configured to convert a first video signal quantized according to a first characteristic to represent a video image with a relative luminance, into a second video signal quantized according to a second characteristic to represent the video image with an absolute luminance in an output of a display device based on a predetermined conversion correspondence relationship, and a signal output unit configured to output information representing the conversion correspondence relationship in association with at least one of the first video signal and the second video signal.

Further features of the present invention will become apparent from the following description of exemplary embodiments with reference to the attached drawings.

DESCRIPTION OF EMBODIMENTS

Suitable exemplary embodiments of the present invention will be described below with reference to the drawings.

Figure 1:
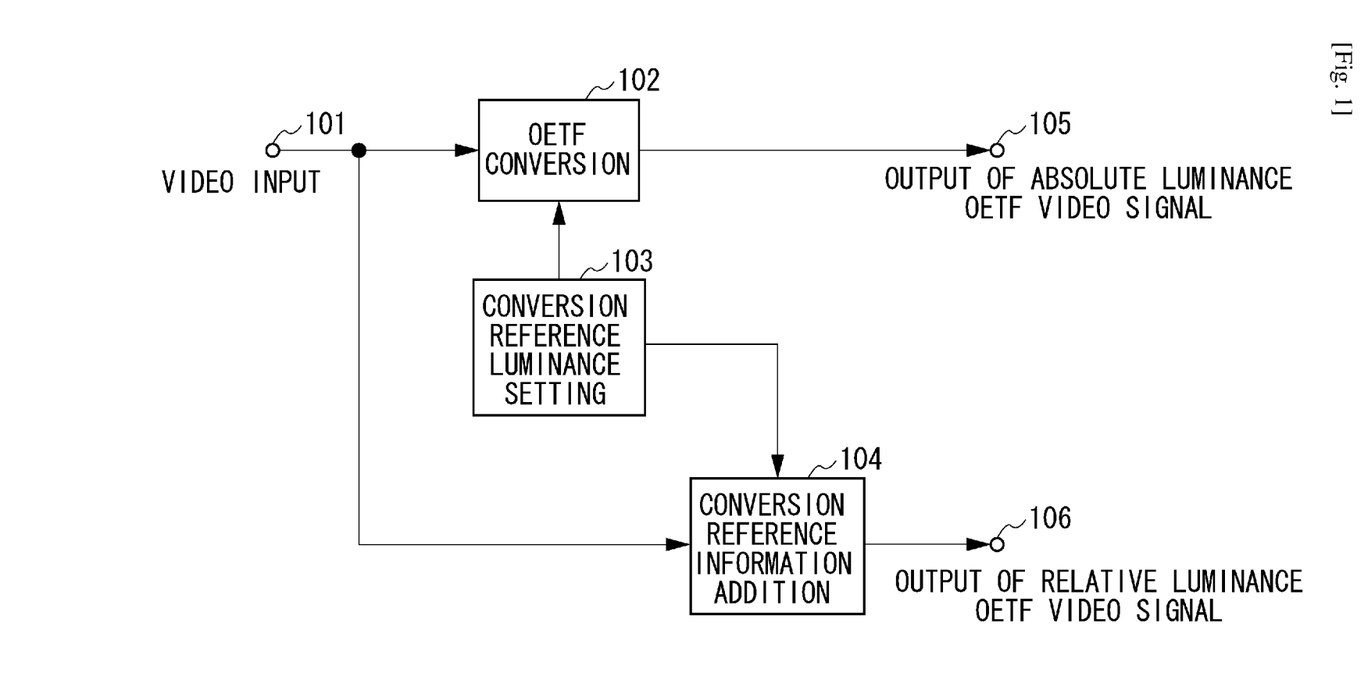
FIG. 1 is a schematic configuration diagram of a video signal processing apparatus according to a first exemplary embodiment of the present invention.

FIG. 1 is a schematic configuration diagram of a video signal processing apparatus according to a first exemplary embodiment of the present invention.

A video signal (first video signal), representing a video image with a relative luminance and quantized according to a relative luminance OETF, is input to a video input of a terminal 101.

Examples of the video signal (first video signal) quantized according to the relative luminance OETF include a luminance linear signal obtained by subjecting an output of a video sensor serving as an image capturing unit to analog-to-digital (A/D) conversion and performing matrix calculation for mapping the output into a predetermined color space, a video signal quantized according to a gamma curve standardized in BT.709, and a Log video signal quantized according to a Log gamma curve having a dynamic range more expanded than that of the gamma curve standardized in BT.709.

In the present exemplary embodiment, the present invention will be described using an example of a Log gamma having a dynamic range up to 800% as the relative luminance OETF. When a signal level of a standard white object is set to 100% in an image captured in correct exposure, the Log gamma is a relative luminance OETF having a dynamic range eight times higher than 100%.

An OETF conversion circuit 102 is a signal conversion unit, and converts the relative luminance OETF video signal (first video signal) into a video signal (second video signal). The second video signal is quantized according to an absolute luminance OETF to represent the relative luminance OETF video signal (first video signal) with an absolute luminance in an output of a display device for monitoring. A terminal 105 is a signal output unit, which outputs the video signal after the conversion.

Examples of the absolute luminance OETF include a reverse characteristic of Perceptual Quantization (PQ) standardized in ST.2084. The PQ is an absolute luminance EOTF and is a quantization characteristic that is visually most efficient for an absolute luminance value of a pixel in displaying a video image. A video signal to be input to a display device having the input characteristic needs to be quantized according to the absolute luminance OETF having the reverse characteristic of the PQ.

Figure 2:
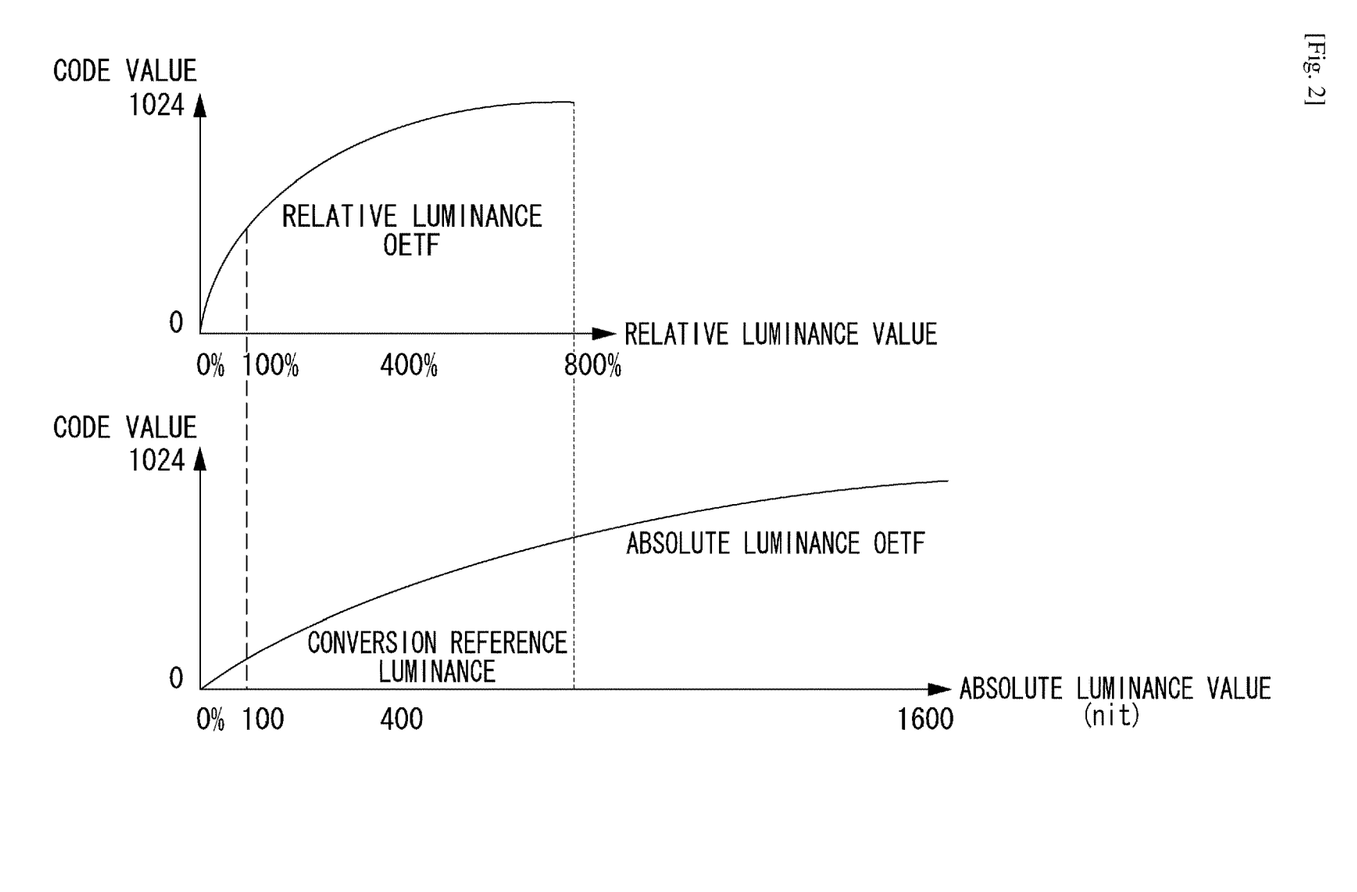
FIG. 2 is a schematic view of conversion from a relative luminance OETF to an absolute luminance OETF.

FIG. 2 is a schematic view of a code mapping for converting a relative luminance OETF having a dynamic range up to 800% into an absolute luminance OETF.

To convert a relative luminance into an absolute luminance for an input video signal, a predetermined conversion reference luminance for conversion from the relative luminance to the absolute luminance is required as a correspondence relationship between video signals having the relative luminance and the absolute luminance. In an example illustrated in FIG. 2, conversion is performed so that 100% in the relative luminance OETF corresponds to 100 nit in the absolute luminance OETF. When a conversion reference luminance is defined as an absolute luminance value corresponding to 100% in the relative luminance OETF, the conversion reference luminance in this case is 100 nit. A conversion reference luminance setting circuit 103 illustrated in FIG. 1 sets the conversion reference luminance for the OETF conversion circuit 102. In the example illustrated in FIG. 2, 100 nit is set as the conversion reference luminance, and the conversion from the relative luminance OETF into the absolute luminance OETF is performed corresponding to the conversion reference luminance in the OETF conversion circuit 102.

Figure 3:
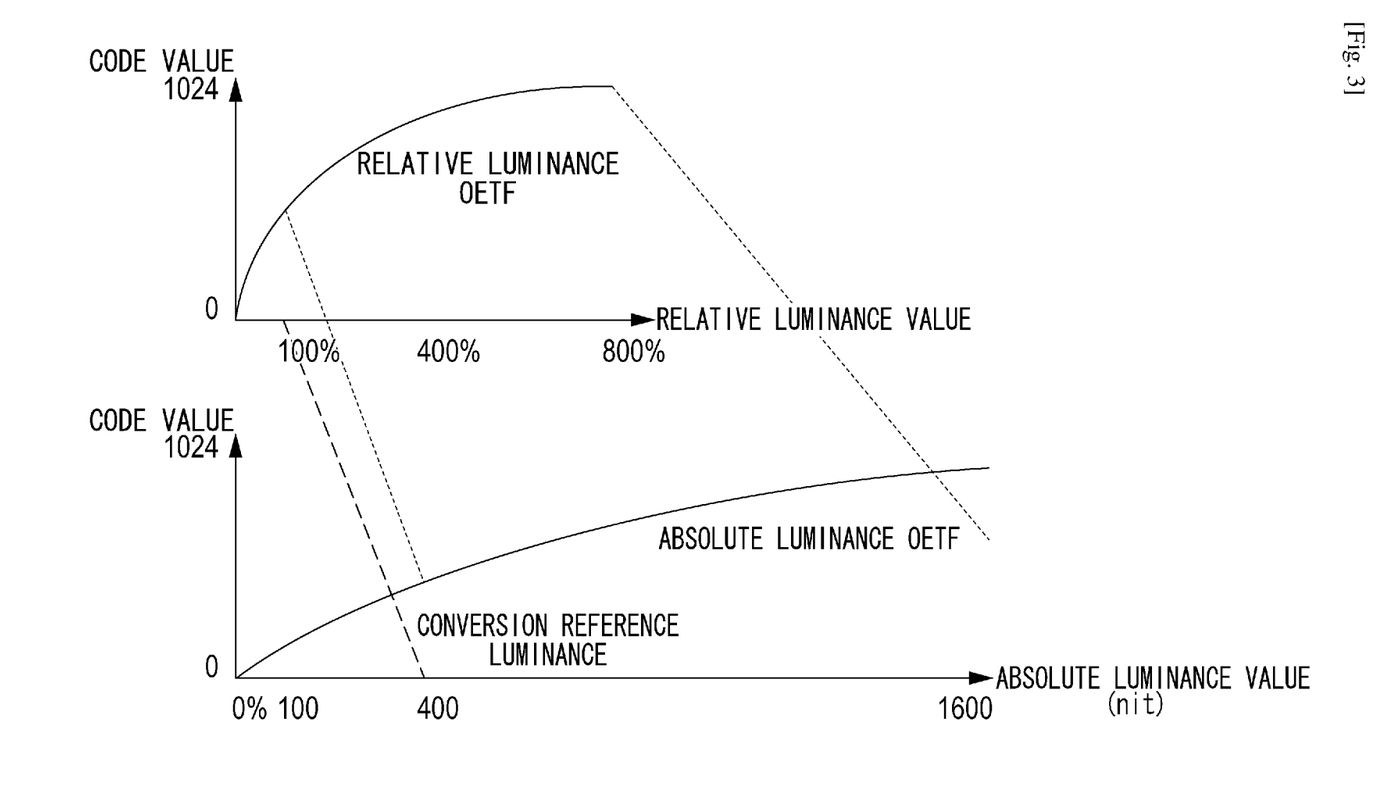
FIG. 3 is a schematic view of conversion from a relative luminance OETF to an absolute luminance OETF.

FIG. 3 is a schematic view of a code mapping when a conversion reference luminance is set to 400 nit. In this case, OETF conversion is performed so that 100% in a relative luminance OETF corresponds to 400 nit in an absolute luminance OETF.

While an absolute luminance corresponding to 100% in the relative luminance OETF is defined as a reference luminance in the above described example, the present invention is not limited to this. For example, an absolute luminance corresponding to 200% in the relative luminance OETF may be a reference luminance. Further, the present invention may be based on definition other than the reference luminance. For example, another definition may be used as long as it represents a conversion correspondence from the relative luminance OETF to the absolute luminance OETF.

A conversion reference information addition circuit 104 illustrated in FIG. 1 adds the conversion reference luminance set by the conversion reference luminance setting circuit 103, to the relative luminance OETF video signal (first video signal) as information representing a conversion correspondence (hereinafter referred to as conversion reference information) from the relative luminance OETF to the absolute luminance OETF. A terminal 106 is a signal output unit, which outputs a video signal with the conversion reference information added thereto. By using this conversion reference information, the same conversion characteristic as that of an absolute luminance OETF video signal (second video signal) obtained after OETF conversion can be reproduced from the relative luminance OETF video signal (first video signal). A configuration for adding the conversion reference information can include meta data in a video file for recording, and a sub-code and meta data to be added to a video file during video transmission.

The conversion reference information may only be output in relation to a video file including a video signal. The present invention is not limited to the above described configuration for adding the conversion reference information to the video file as the meta data. The conversion reference information may only be output in association with the video file as needed for reference.

Figure 4:
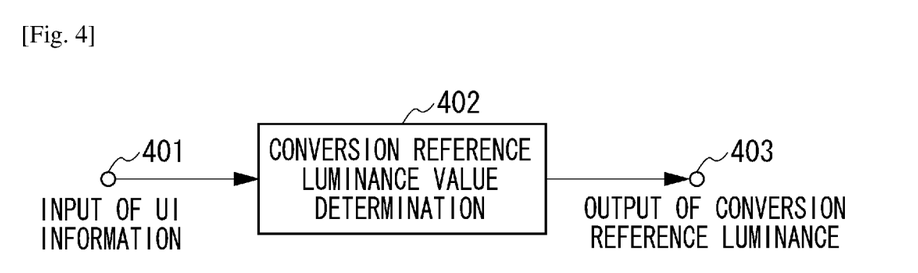
FIG. 4 illustrates a configuration example of a conversion reference luminance setting circuit in a first exemplary embodiment.

FIG. 4 illustrates a configuration example of the conversion reference luminance setting circuit 103. User Interface (UI) information for selecting a conversion reference luminance is input from a terminal 401. A source of the UI information can be UI information through a menu operation of the video signal processing apparatus, UI information received in communication with an external device, or UI information to be selected according to a previously programmed procedure.

The above described conversion reference luminance can be set using the conversion reference luminance setting circuit 103 as a unit for setting a conversion correspondence relationship. The conversion reference luminance setting circuit 103 may be provided in the external device communicating with the video signal processing apparatus to make a setting from the external device.

A conversion reference luminance value determination circuit 402 decodes the above described UI information, and outputs the decoded UI information as the conversion reference luminance from a terminal 403.

According to the above described exemplary embodiment, also when an image is captured to adjust exposure using a standard object, the video image can be displayed through output of the absolute luminance OETF by setting the conversion reference luminance from the relative luminance OETF to the absolute luminance OETF. Therefore, when conversion reference luminance information is used which is output in association with the video data, conversion into the same absolute luminance OETF can be carried out also in RAW development processing and post production.

Figure 5:
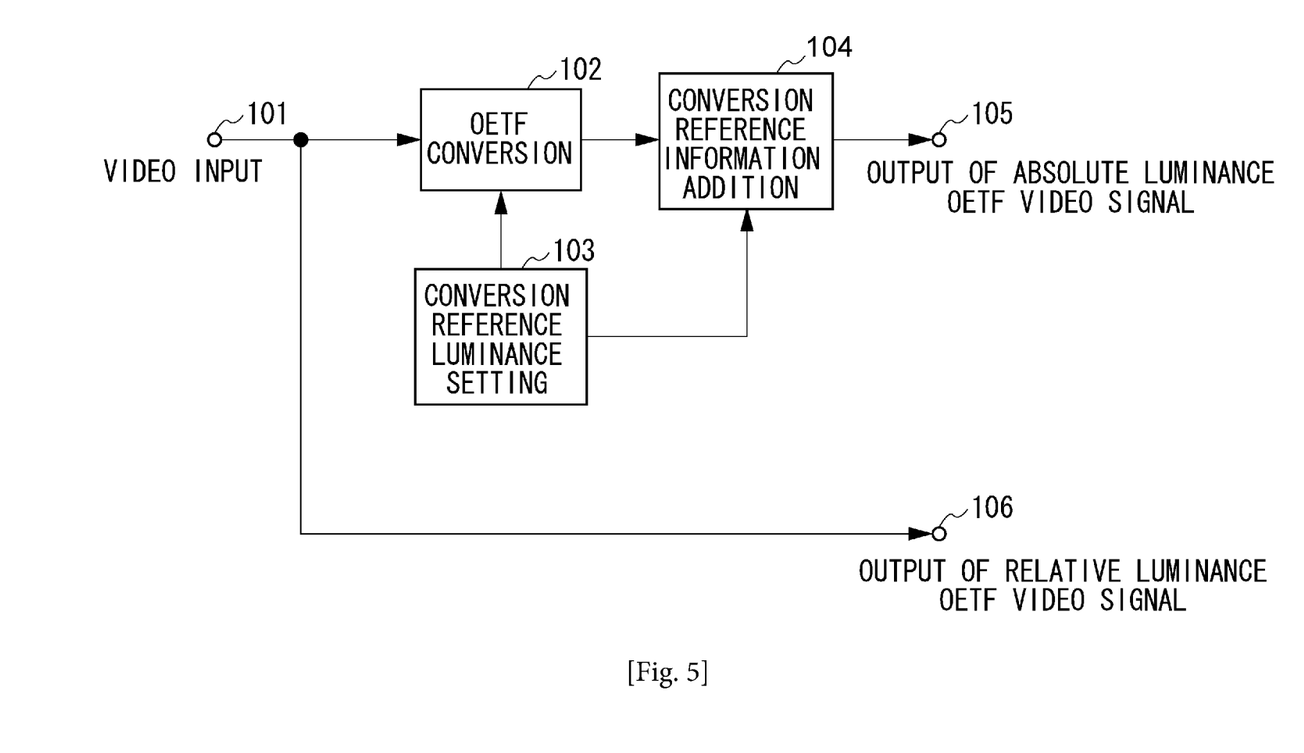
FIG. 5 is a schematic configuration diagram of a video signal processing apparatus according to a second exemplary embodiment.

FIG. 5 is a schematic configuration diagram of a video signal processing apparatus that adds conversion reference information to a video signal (second video signal) according to an absolute luminance OETF as a second exemplary embodiment of the present invention. The second exemplary embodiment is the same as the first exemplary embodiment except for the video signal to which the conversion reference information is to be added, and hence overlapping description is not repeated.

A video signal (first video signal) quantized according to a relative luminance OETF is input to a video input of a terminal 101.

An OETF conversion circuit 102 converts the relative luminance OETF video signal (first video signal) into an absolute luminance OETF video signal (second video signal).

A conversion reference luminance setting circuit 103 sets a conversion reference luminance to the OETF conversion circuit 102.

A conversion reference information addition circuit 104 adds the conversion reference luminance, which has been set by the conversion reference luminance setting circuit 103, to the absolute luminance OETF video signal (second video signal) as the conversion reference information. A terminal 105 outputs the video signal having the conversion reference information added thereto.

A terminal 106 outputs the relative luminance OETF video signal (first video signal).

Figure 6:
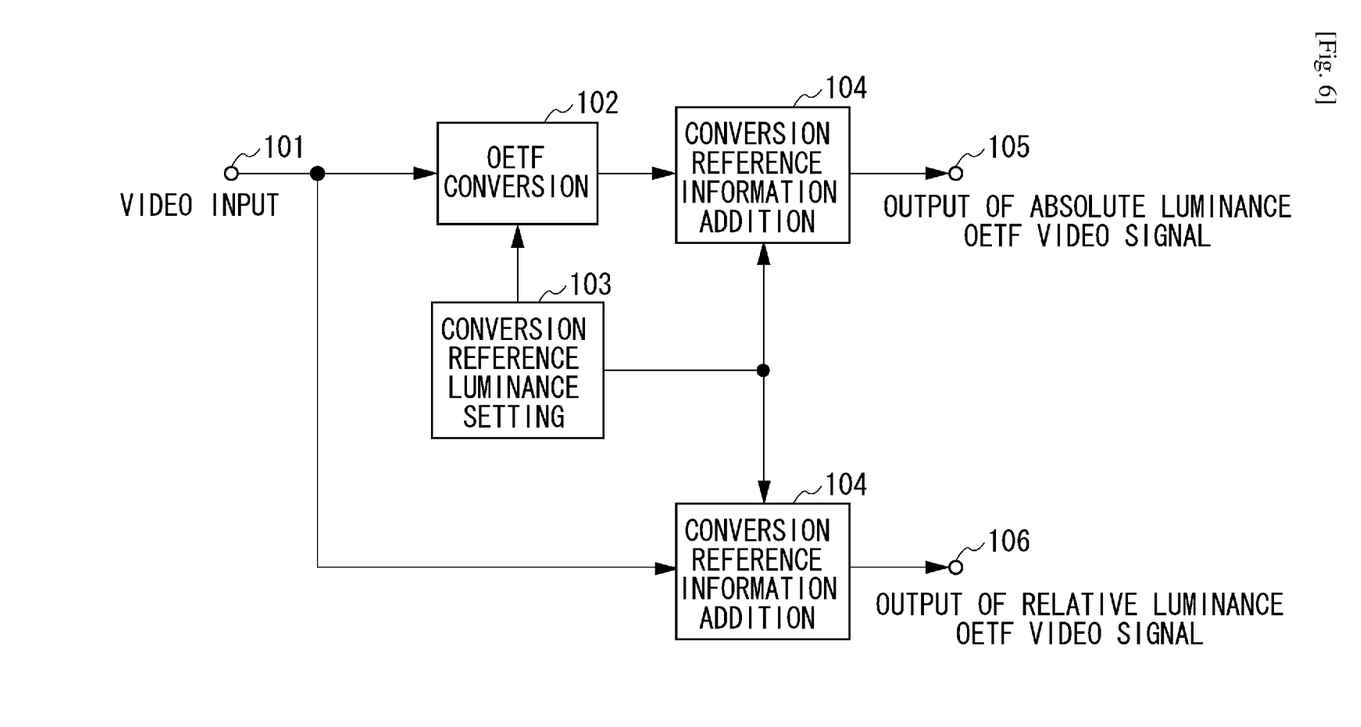
FIG. 6 is a schematic configuration diagram of a video signal processing apparatus according to a third exemplary embodiment.

FIG. 6 is a schematic configuration diagram of a video signal processing apparatus that adds conversion reference information to both a video signal (first video signal) according to a relative luminance OETF and a video signal (second video signal) according to an absolute luminance OETF as a third exemplary embodiment of the present invention. The third exemplary embodiment is the same as the first exemplary embodiment except for the video signals to which the conversion reference information is to be added, and hence overlapping description is not repeated.

A relative luminance OETF video signal (first video signal) is input to a video input of a terminal 101.

An OETF conversion circuit 102 converts the relative luminance OETF video signal (first video signal) into an absolute luminance OETF video signal (second video signal).

A conversion reference luminance setting circuit 103 sets a conversion reference luminance to the OETF conversion circuit 102.

A conversion reference information addition circuit 104 adds the conversion reference luminance, which has been set by the conversion reference luminance setting circuit 103, to both the relative luminance OETF video signal (first video signal) and the absolute luminance OETF video signal (second video signal) as the conversion reference information. Terminals 106 and 105 respectively output the video signals with the conversion reference information added thereto.

Figure 7:
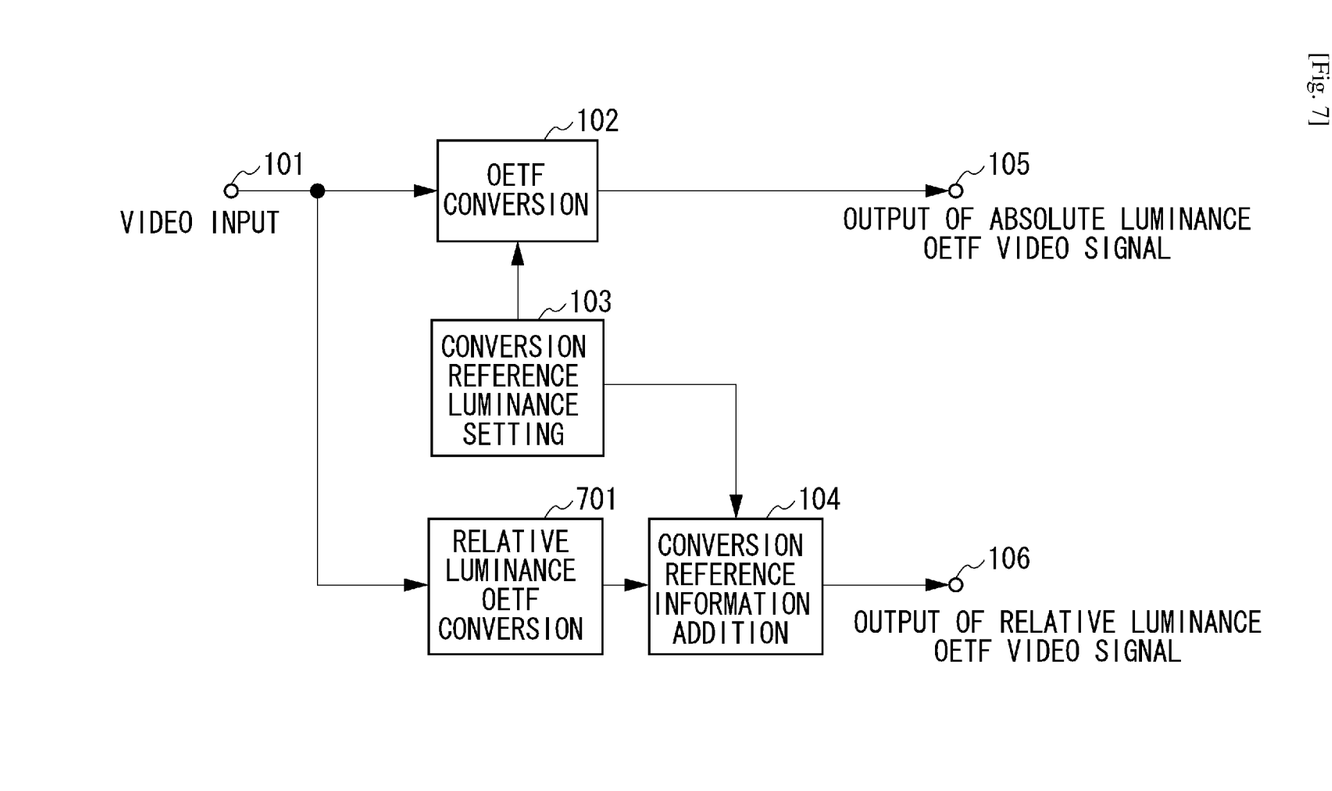
FIG. 7 is a schematic configuration diagram of a video signal processing apparatus according to a fourth exemplary embodiment.

FIG. 7 is a schematic configuration diagram of a video signal processing apparatus that converts a video signal (first video signal) quantized according to a first relative luminance OETF into a video signal (second video signal) quantized according to an absolute luminance OETF and converts into a video signal (third video signal) quantized according to a second relative luminance OETF. The video signal processing apparatus outputs the converted video signals, and adds conversion reference information to the second relative luminance OETF video signal (third video signal) as a fourth exemplary embodiment of the present invention.

The present exemplary embodiment corresponds to a configuration in which a luminance linear signal obtained by subjecting an output of a video sensor serving as an image capturing unit to A/D conversion and performing color space matrix processing for the output, as described above, as the first relative luminance OETF video signal (first video signal). The obtained linear signal is directly converted into an absolute luminance OETF video signal while second relative luminance OETF conversion from the luminance linear signal to a Log gamma signal is performed. Such a configuration produces an effect of reducing degradation of accuracy caused by performing quantization characteristic conversion in multistage processes when the absolute luminance OETF video signal is generated.

A video signal quantized according to a first relative luminance OETF (first video signal) is input to a video input of a terminal 101.

An OETF conversion circuit 102 converts the video signal quantized according to the first relative luminance OETF (first video signal) into a video signal quantized according to an absolute luminance OETF video signal (second video signal), and outputs the converted video signal from a terminal 105.

A conversion reference luminance setting circuit 103 sets a conversion reference luminance to the OETF conversion circuit 102.

A relative luminance OETF conversion circuit 701 converts the first relative luminance OETF video signal (first video signal) input from the terminal 101, into a second relative luminance OETF video signal (third video signal).

As described above, as the first relative luminance OETF a luminance linear characteristic is conceivable, and as the second relative luminance OETF, BT.709 and a Log gamma characteristic are conceivable.

A conversion reference information addition circuit 104 adds the conversion reference luminance set by the conversion reference luminance setting circuit 103, to the second relative luminance OETF video signal (third video signal) as conversion reference information, and outputs the video signal with the conversion reference information added thereto from a terminal 106.

The conversion reference information added in the conversion reference information addition circuit 104 is a reference luminance in performing conversion from the first relative luminance OETF to the absolute luminance OETF in the OETF conversion circuit 102.

When the relative luminance OETF conversion circuit 701 converts the first relative luminance OETF to the second relative luminance OETF, if respective relative luminance values in the first and second relative luminance OETFs before and after the conversion do not change, i.e., if a conversion gain between the OETFs is 1, a 100% luminance in the first relative luminance OETF is a 100% luminance in the second relative luminance OETF.

In this case, a result of converting the second relative luminance OETF into the absolute luminance OETF based on the conversion reference information added in the conversion reference information addition circuit 104 becomes equal to a conversion result from the first relative luminance OETF to the absolute luminance OETF in the OETF conversion circuit 102.

Thus, the absolute luminance OETF video signal (second video signal) can be reproduced, using the added conversion reference information, from the second relative luminance OETF video signal (third video signal) that has been output from the terminal 106.

Conversion from a normal luminance linear signal to a BT.709 video gamma signal and to a Log gamma signal can be considered as conversion with a gain of 1, and the above equivalence of the conversion reference luminance holds.

When conversion between relative luminance OETFs with a conversion gain that is not 1 is used, a conversion reference luminance, which has been translated into a reference value of a relative luminance after the conversion, is added as conversion reference information. Thus, an absolute luminance OETF video signal can similarly be reproduced, using the added conversion reference information, from the video signal output of second relative luminance OETF.

Figure 8:
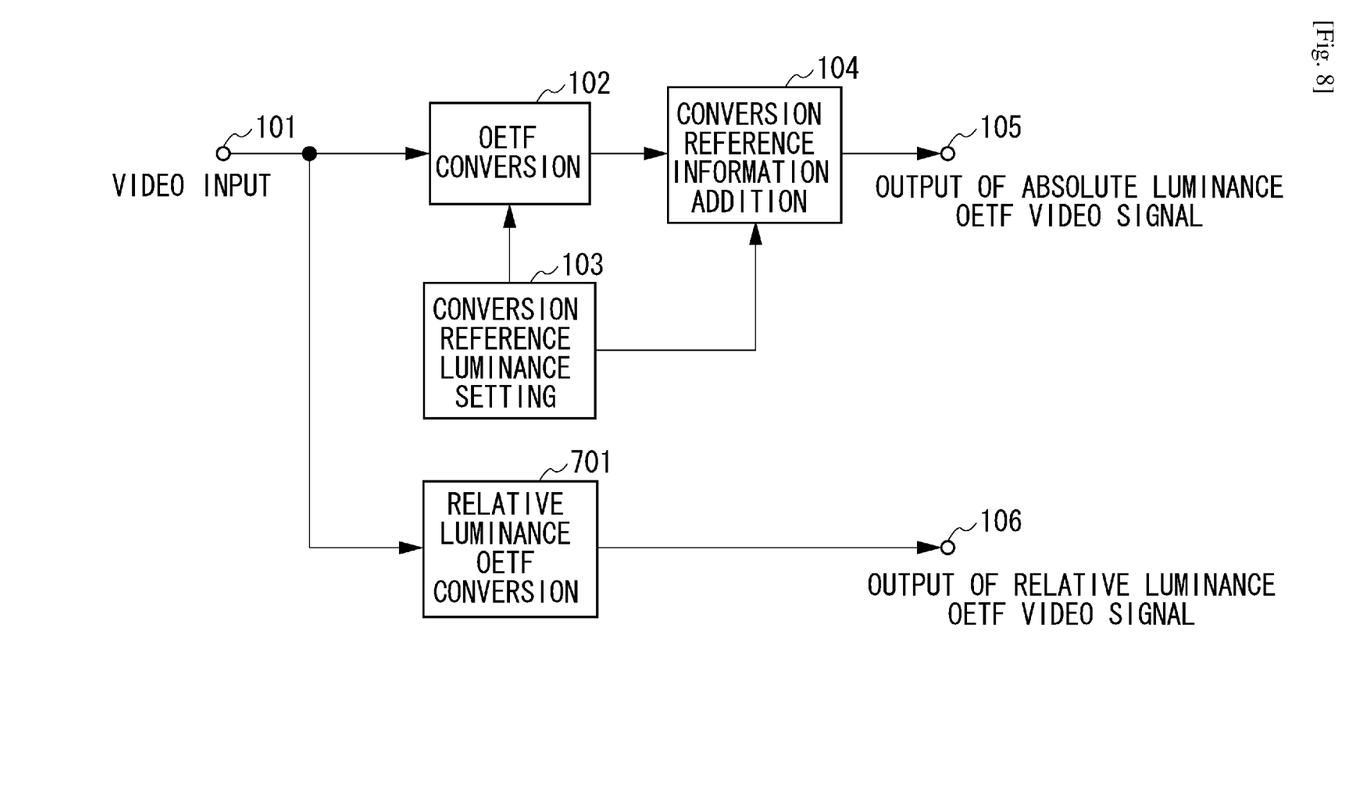
FIG. 8 is a schematic configuration diagram of a video signal processing apparatus according to a fifth exemplary embodiment.

FIG. 8 is a schematic configuration diagram of a video signal processing apparatus according to a fifth exemplary embodiment of the present invention that converts a video signal (first video signal) quantized according to a first relative luminance OETF into a video signal (second video signal) quantized according to an absolute luminance OETF, and into a video signal (third video signal) quantized according to a second relative luminance OETF. The converted video signals are output, and the conversion reference information is added to the absolute luminance OETF video signal (second video signal). The fifth exemplary embodiment is the same as the fourth exemplary embodiment except that the video signal to which the conversion reference information is added is different, and hence overlapping description is not repeated.

A video signal quantized according to the first relative luminance OETF (first video signal) is input to a video input of a terminal 101.

An OETF conversion circuit 102 converts the video signal quantized according to the first relative luminance OETF (first video signal) into a video signal quantized according to absolute luminance OETF (second video signal).

A conversion reference luminance setting circuit 103 sets a conversion reference luminance to the OETF conversion circuit 102.

A relative luminance OETF conversion circuit 701 converts the first relative luminance OETF video signal (first video signal) input from the terminal 101, into a second relative luminance OETF video signal (third video signal), and outputs the converted video signal from a terminal 106.

A conversion reference information addition circuit 104 adds the conversion reference luminance set by the conversion reference luminance setting circuit 103, to the absolute luminance OETF video signal (second video signal) as conversion reference information, and outputs the video signal with the conversion reference information added thereto from a terminal 105.

Figure 9:
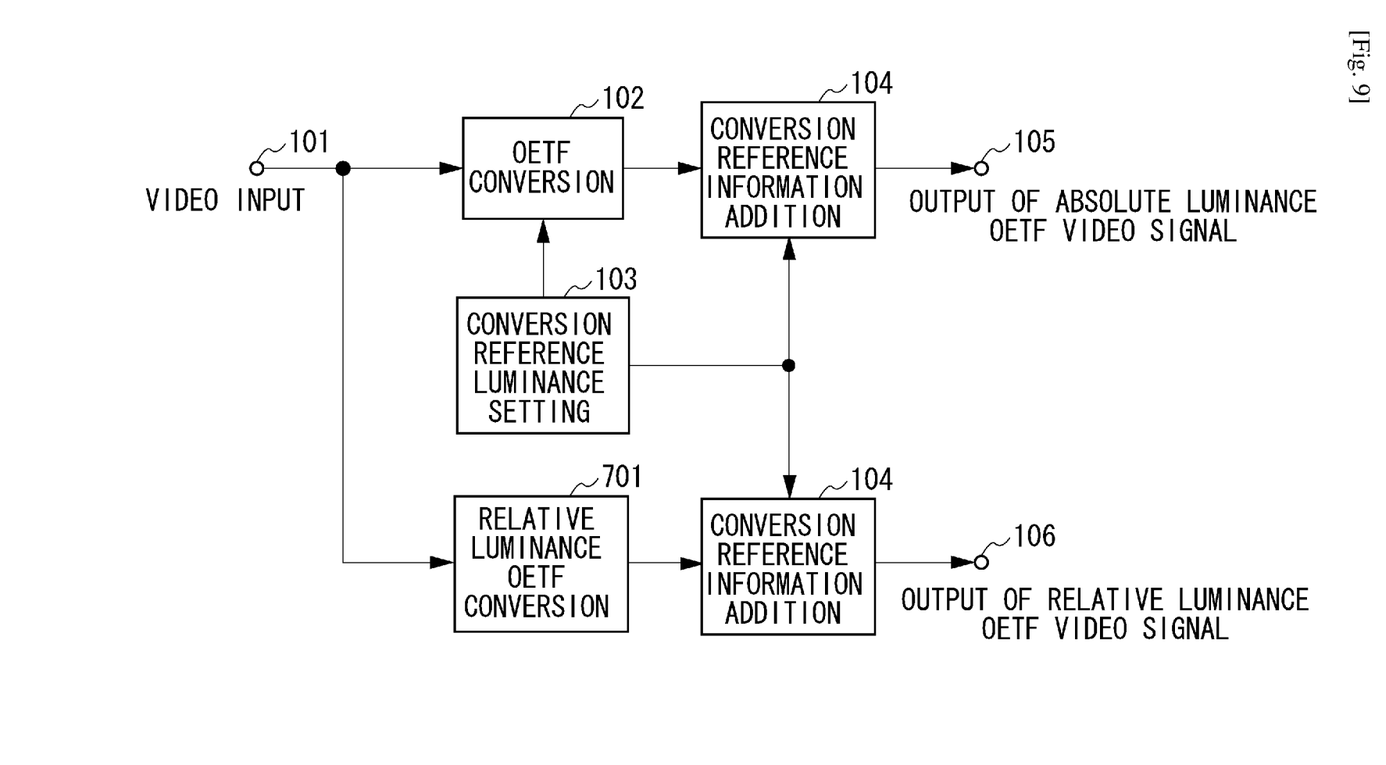
FIG. 9 is a schematic configuration diagram of a video signal processing apparatus according to a sixth exemplary embodiment.

FIG. 9 is a schematic configuration diagram of a video signal processing apparatus according to a sixth exemplary embodiment of the present invention that converts a video signal (first video signal) quantized according to a first relative luminance OETF into a video signal (second video signal) quantized according to an absolute luminance OETF, and into a video signal (third video signal) quantized according to a second relative luminance OETF. The converted video signals is output, and the conversion reference information is added to both the absolute luminance OETF video signal (second video signal) and the second relative luminance OETF video signal (third video signal).

A video signal quantized according to the first relative luminance OETF (first video signal) is input to a video input of a terminal 101.

An OETF conversion circuit 102 converts the video signal quantized according to the first relative luminance OETF (first video signal) into an absolute luminance OETF (second video signal).

A conversion reference luminance setting circuit 103 sets a conversion reference luminance to the OETF conversion circuit 102.

A relative luminance OETF conversion circuit 701 converts the video signal of first relative luminance OETF (first video signal) input from the terminal 101, into a video signal of second relative luminance OETF (third video signal).

A conversion reference information addition circuit 104 adds the conversion reference luminance set by the conversion reference luminance setting circuit 103, to both the second relative luminance OETF video signal (third video signal) and the absolute luminance OETF video signal (second video signal) as conversion reference information. The video signals with the conversion reference information added thereto are output from terminals 106 and 105.

Figure 10:
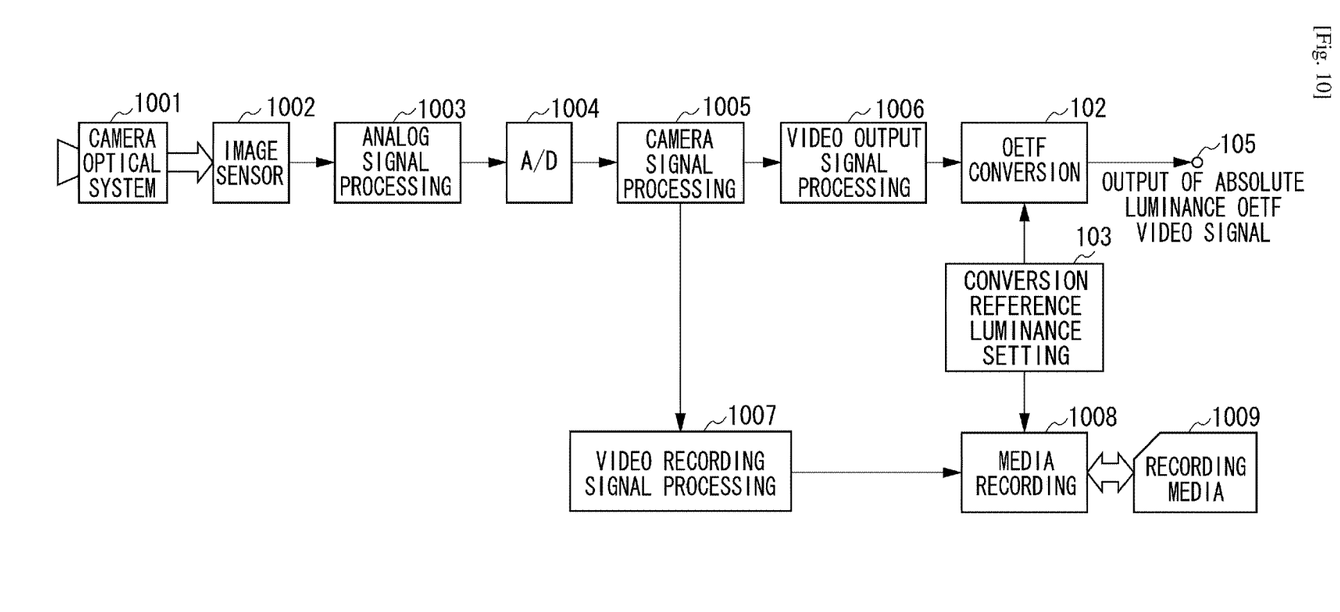
FIG. 10 is a schematic configuration diagram of an image capturing apparatus according to a seventh exemplary embodiment.

FIG. 10 is a schematic configuration diagram of an image capturing apparatus having a function of outputting an absolute luminance OETF video image and a function of recording a relative luminance OETF video image, according to a seventh exemplary embodiment of the present invention.

A camera optical system 1001 includes optical devices such as a lens, a diaphragm, and a shutter, and forms an optical image on an image sensor 1002.

An image sensor 1002 converts the formed optical image into an electric signal. An analog signal processing circuit 1003 performs analog signal processing such as amplification processing on a video signal converted into an electric signal. An A/D conversion circuit 1004 converts the analog video signal into a digital signal.

A camera signal processing circuit 1005 performs interpolation processing of an image sensor pixel array, color space matrix processing, and white balance processing on the digital signal obtained by the A/D conversion, and outputs the obtained digital signal as a digital video signal.

A video output signal processing circuit 1006 performs color space processing and gray scale processing for outputting the digital video signal as a real time video signal.

The video signal in this stage is a relative luminance OETF video signal (first video signal) according to an exposure setting determined by a camera optical system and gain setting in analog/digital signal processing.

An OETF conversion circuit 102 converts the video signal quantized according to a relative luminance OETF (first video signal) into a video signal (second video signal) quantized according to an absolute luminance OETF, and outputs the converted video signal from a terminal 105.

A conversion reference luminance setting circuit 103 sets a conversion reference luminance to the OETF conversion circuit 102.

A video recording signal processing circuit 1007 performs coding processing and meta data addition processing for recording the relative luminance OETF video signal.

A media recording circuit 1008 serving as a recording unit adds the conversion reference luminance fed from the conversion reference luminance setting circuit 103 as meta data representing conversion reference information to the coded relative luminance OETF video signal (first video signal), and records the obtained video signal with the conversion reference information added thereto on a recording media 1009.

When the relative luminance OETF video signal data recorded on the recording media 1009 is converted into an absolute luminance OETF video signal using the added conversion reference information, a video image can be obtained which shows a conversion result same as the absolute luminance OETF video image output from the terminal 105.

While in the present embodiment, the image capturing apparatus using the video signal processing apparatus according to the above described first exemplary embodiment has been described as an example, the video signal processing apparatus may be replaced with the video signal processing apparatus according to any one of the second to sixth exemplary embodiments.

While the suitable exemplary embodiments of the present invention have been described above, the present invention is not limited to the exemplary embodiments. Various modifications and alterations can be made without departing from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-054063, filed Mar. 17, 2015, which is hereby incorporated by reference herein in its entirety.

The invention claimed is:

1. A signal processing apparatus that processes a video signal, comprising:
 a signal conversion unit configured to convert a first video signal quantized according to a first characteristic to represent a video image with a relative luminance, into a second video signal quantized according to a second characteristic to represent the video image with an absolute luminance in an output of a display device based on a predetermined conversion correspondence relationship; and
 a signal output unit configured to output information representing the conversion correspondence relationship in association with at least one of the first video signal and the second video signal.

2. A signal processing apparatus that processes a video signal, comprising:
 a first signal conversion unit configured to convert a first video signal quantized according to a first characteristic to represent a video image with a relative luminance, into a second video signal quantized according to a second characteristic to represent the video image with an absolute luminance in an output of a display device based on a predetermined conversion correspondence relationship; and
 a second signal conversion unit configured to convert the first video signal into a third video signal quantized according to a third characteristic which is different from the first characteristic; and
 a signal output unit configured to output information representing the conversion correspondence relationship in association with at least one of the second video signal and the third video signal.

3. The signal processing apparatus according to claim 2, wherein
 the conversion correspondence relationship is a reference luminance representing a correspondence relationship between the relative luminance of the first video signal and the absolute value of the second video signal.

4. The signal processing apparatus according to claim 2, wherein
 the signal output unit adds information representing the conversion correspondence relationship to the video signal, and outputs the video signal with the information added thereto.

5. The signal processing apparatus according to claim 2, further comprising
 a setting unit configured to set the conversion correspondence relationship.

6. The signal processing apparatus according to claim 1, wherein the conversion correspondence relationship is a reference luminance representing a correspondence relationship between the relative luminance of the first video signal and the absolute value of the second video signal.

7. The signal processing apparatus according to claim 1, wherein the signal output unit adds information representing the conversion correspondence relationship to the video signal, and outputs the video signal with the information added thereto.

8. The signal processing apparatus according to claim 1, further comprising:
 a setting unit configured to set the conversion correspondence relationship.

9. An image capturing apparatus comprising:
 a signal processing apparatus comprising,
  a first signal conversion unit configured to convert a first video signal quantized according to a first characteristic to represent a video image with a relative luminance, into a second video signal quantized according to a second characteristic to represent the video image with an absolute luminance in an output of a display device based on a predetermined conversion correspondence relationship;
  a second signal conversion unit configured to convert the first video signal into a third video signal quantized according to a third characteristic which is different from the first characteristic; and
  a signal output unit configured to output information representing the conversion correspondence relationship in association with at least one of the second video signal and the third video signal; and an image capturing unit configured to acquire a video signal to be input to the signal processing apparatus by image capturing.

10. The image capturing apparatus according to claim 9, further comprising a recording unit configured to record a video signal output from the signal output unit together with information representing the conversion correspondence relationship.

11. A signal processing method for processing a video signal, comprising:

converting a first video signal quantized according to a first characteristic to represent a video image with a relative luminance, into a second video signal quantized according to a second characteristic to represent the video image with an absolute luminance in an output of a display device based on a predetermined conversion correspondence relationship; and outputting information representing the conversion correspondence relationship in association with at least one of the first video signal and the second video signal.

12. A signal processing method for processing a video signal, comprising:

performing first signal conversion for converting a first video signal quantized according to a first characteristic to represent a video image with a relative luminance, into a second video signal quantized according to a second characteristic to represent the video image with an absolute luminance in an output of a display device based on a predetermined conversion correspondence relationship; and performing second signal conversion for converting the first video signal into a third video signal quantized according to a third characteristic which is different from the first characteristic; and outputting information representing the conversion correspondence relationship in association with at least one of the second video signal and the third video signal.

13. An image capturing apparatus comprising:

the signal processing apparatus comprising, a signal conversion unit configured to convert a first video signal quantized according to a first characteristic to represent a video image with a relative luminance, into a second video signal quantized according to a second characteristic to represent the video image with an absolute luminance in an output of a display device based on a predetermined conversion correspondence relationship; and a signal output unit configured to output information representing the conversion correspondence relationship in association with at least one of the first video signal and the second video signal; and an image capturing unit configured to acquire a video signal to be input to the signal processing apparatus by image capturing.

14. The image capturing apparatus according to claim 13, further comprising:

a recording unit configured to record a video signal output from the signal output unit together with information representing the conversion correspondence relationship.

* * * * *